(12) United States Patent
Jung (10) Patent No.: US 9,264,776 B2
(45) Date of Patent: Feb. 16, 2016

(54) APPARATUS OF RENDERING USER INTERFACE FOR PLAYING BROADCAST PROGRAMS AND THE METHOD THEREOF

(71) Applicant: TVSTORM CO., LTD., Seoul (KR)

(72) Inventor: Un Gyo Jung, Hwaseong-shi (KR)

(73) Assignee: TVSTORM CO., LTD., Seoul (KR)

( * ) Notice: Subject to any disclaimer, the term of this patent is extended or adjusted under 35 U.S.C. 154(b) by 118 days.

(21) Appl. No.: 13/989,231

(22) PCT Filed: Dec. 28, 2012

(86) PCT No.: PCT/KR2012/011660

§ 371 (c)(1),
(2) Date: May 23, 2013

(87) PCT Pub. No.: WO2013/183842

PCT Pub. Date: Dec. 12, 2013

(65) Prior Publication Data

US 2014/0215514 A1 Jul. 31, 2014

(30) Foreign Application Priority Data

Jun. 5, 2012 (KR) .................. 10-2012-0060095

(51) Int. Cl.
*H04N 21/482* (2011.01)
*H04N 21/472* (2011.01)
*H04N 21/462* (2011.01)

(52) U.S. Cl.
CPC ..... *H04N 21/47217* (2013.01); *H04N 21/4622* (2013.01); *H04N 21/482* (2013.01)

(58) Field of Classification Search
CPC ................................... H04N 21/482

USPC .......................................... 725/38, 9
See application file for complete search history.

(56) References Cited

U.S. PATENT DOCUMENTS

| 7,308,489 | B2 | 12/2007 | Weast |
| 7,827,490 | B2 | 11/2010 | Kapur et al. |
| 2004/0243700 | A1 | 12/2004 | Weast |
| 2006/0135057 | A1 | 6/2006 | Park et al. |
| 2008/0134036 | A1 | 6/2008 | Kapur et al. |
| 2011/0113440 | A1* | 5/2011 | Roberts ............. H04H 60/33 725/9 |

FOREIGN PATENT DOCUMENTS

| KR | 10-2005-0080829 | 8/2005 |
| KR | 10-2006-0019545 | 3/2006 |
| KR | 10-2006-0063240 | 6/2006 |
| KR | 10-2009-0094255 | 9/2009 |

OTHER PUBLICATIONS

International Search Report and Written Opinion dated Apr. 8, 2013 from the corresponding PCT/KR2012/011660.

* cited by examiner

*Primary Examiner* — Jeffery Harold
*Assistant Examiner* — Sihar Karwan
(74) *Attorney, Agent, or Firm* — Katten Muchin Rosenman LLP (57) ABSTRACT

Disclosed an apparatus and method of rendering user interface for playing the broadcast program, which is effective to enable a user to view the broadcast program without being limited to the past or future time zone, in the case that a user makes the current viewing point be located in the past or future time zone compared to the current broadcasting point when the broadcast program is played.

11 Claims, 5 Drawing Sheets

APPARATUS OF RENDERING USER INTERFACE FOR PLAYING BROADCAST PROGRAMS AND THE METHOD THEREOF

TECHNICAL FIELD

The present invention relates to an apparatus of rendering user interface for playing broadcast programs and the method thereof, and in more details, it relates to an apparatus and method for rendering the user interface for seamlessly viewing the future broadcast program in the case that a user moves the current viewing point to the future time zone of the current broadcasting point through time-shift or trick-play while the user views a broadcasting program.

BACKGROUND

Recently, broadcasting programs (including video, audio, data or their combinations thereof) can be viewed (or watched in other word) or played regardless of the place where he/she views or plays them through computers (i.e., PCs, laptops, netbooks, tablet PC, etc.) and mobile terminals (i.e., smart phones, pads, dedicated terminals, etc.) as well as traditional televisions (TVs). In addition, broadcasting services can be provided through On-Demand method by virtue of Internet and IP network infrastructure advancements and the streaming technology development.

Hereinafter, for the convenience of descriptions, the meanings of television in the present invention can be understood as those including every possible device to view (or watch) the broadcast programs and all software applications capable of viewing (or watching) broadcast programs.

In the conventional case of viewing broadcast programs, broadcast programs for the parts that have already been broadcasted (i.e., programs having been broadcasted in the past time zone) could become to be viewed at any time by playing the recorded broadcast programs using the televisions embedding DVR (Digital Video Recorder) features. That is, as described above, in the case that a user wants to play the broadcast programs that have already been recorded, a user can change the viewing (or playing) point to the past time zone or select a desired part of the recorded broadcast program and then view the selected part again at the desired speed.

However, it is not being supported to view the part of the broadcast program (i.e., future time zone of the broadcast program) that has not yet been broadcasted. In other words, even though the broadcast program that has been broadcasted in the past time zone can be viewed by selecting the point that was broadcasted in the past as a viewing point, the parts of the program after the current broadcasting point (i.e., future time zone) could not be viewed. That is, the conventional method could not select the viewing point in the future time zone of the broadcast program, thereby the future time zone of the broadcast program could not be viewed. Due to the above reasons, it was uncomfortable for a user to view a broadcast program.

Meanwhile, Korean patent application KR2009-0094255, as a conventional technology, relates to a method of rendering a user interface for a media status, a display apparatus where the user interface is rendered, and computer readable recording media, it just displays the current playing and viewing positions of a media contents, and provides the information related to handle and process the media contents, but there is no suggestion related to the provision and process of the information for viewing the future point of a media contents.

Recently, that is, the concept that the viewing of broadcast program should always be viewed at same time as the program is broadcasted has been being gone, and it is recognized as the broadcast program that a user wants to view can be selectively viewed at any time. Therefore, while a user wants to selectively view the broadcast program that the user wants to view regardless of the broadcasting point, the conventional broadcast program interface rendering apparatus and method did not provide the means for which a user can move the broadcasting point to the future time zone(or region, period etc.) of the current broadcasting time.

Therefore, there need a user interface rendering process enabling a user to change the viewing point to the future time zone while the user is in the middle of viewing a broadcast program, as well as considering various issues (i.e., various items including the user's viewing preferences, service policy enforcement of broadcasting service companies, and technical constraints, etc.,) accompanied in the case of changing the viewing point to the future time zone.

SUMMARY

The present invention was invented in order to improve the above identified problems, thereby one of the objectives of the present invention is to provide an apparatus of rendering user interface for playing broadcast programs and the method thereof, in which a user can select and view the future time zone of broadcast programs as a viewing point in the middle of viewing a broadcast program through a television.

Moreover, the present invention was invented in order to improve the above identified problems, thereby one of the objectives of the present invention is to provide an apparatus and method for rendering the user interface for seamlessly and continuously viewing the future broadcast program in the case that a user selects the future time zone as a viewing point and the selected viewing point is available for the user to view the future broadcast program.

Moreover, the present invention was invented in order to improve the above identified problems, thereby one of the objectives of the present invention is to provide an apparatus and method for rendering the user interface for playing broadcast programs, in which various information including guide information, option selection menu and alternative information necessary for the user is displayed, in case that there is no any playable broadcast program at the future viewing point that the user selects.

In addition, the present invention was invented in order to improve the above identified problems, thereby one of the objectives of the present invention is to provide an apparatus and method for rendering the user interface for time free viewing (or watching, playing or playing back) of the broadcast program with a desired viewing (or watching, playing or playing back) speed by selecting one time point of past time zone or future time zone as the viewing point of the broadcast program.

The present invention provides effects of improving user experiences through time free viewing (or watching, playing (back), etc.) by enabling a user to seamlessly and continuously view the future broadcast program without displaying any other extra guide information in the case that the user selects the future time zone of the broadcast program as the viewing point, and by enabling the user to view a new other broadcast program or enabling the user to display alternative information (i.e., various additional contents including advertisement, music, educational contents and Internet) in the case that the user cannot view the future broadcast program.

The present invention relates to an apparatus and method of rendering user interface for playing the broadcast program, which is effective to enable a user to view the broadcast program without being limited to the past or future time zone, in the case that a user makes the current viewing point be located in the past or future time zone compared to the current broadcasting point when the broadcast program is played.

BRIEF DESCRIPTION OF THE DRAWINGS

The accompanying drawings, which are included to provide a further understanding of the invention, illustrate the preferred embodiments of the invention, and together with the description, serve to explain the principles of the present invention. In drawings:

FIG. 5A to 5C show exemplary drawings for explaining the method for rendering a user interface according to an embodiment of the present invention, in case that the viewing point is in the future time zone.

DETAILED DESCRIPTION

Hereinafter, the apparatus and method for rendering the user interface for viewing broadcast programs in accordance with the present invention are described with reference to the accompanying drawings.

First, the point of the terminology in the present invention has a temporal meaning, which is used for the viewing point (the point which a user is now viewing or selects for viewing broadcast programs), the playback point or the broadcasting point of broadcast programs, and the position of the terminology in the present invention has a spatial meaning, which is used for the viewing position (the position which a user is now viewing or selects for viewing broadcast programs), playback position or the broadcasting position of broadcast programs. For the parts that the point can be used to be mixed with the position, the concepts of the point and the position can be alternately utilized.

Moreover, the term of the current viewing point (or position) means a time point (a temporal point) or a position (a spatial position of broadcast programs) which a user is currently viewing, the current broadcasting point(or position) means the temporal and spatial point (or position) that a broadcast program is currently being broadcasted, the past viewing means that a user selects and plays the past time zone of the broadcast program, and the future viewing (or preview) means that a user selects and plays the future time zone of the broadcast programs.

In addition, the facts that there are some situations for which a user can view the broadcast programs even in the cases that the viewing point of the user is in the future time zone of the current broadcasting point would be reminded in the present invention, and the facts that if a user selects the future time zone of a broadcast program as a viewing point and the current viewing point overtakes the current broadcasting point of a broadcast program and then enters to the future time zone, the contents including the broadcast program in the future time zone for the current broadcast program, advertisement or music can be loaded and seamlessly and continuously viewed, would be revealed in the present invention.

In addition, the meaning of normal speed play is to play broadcast programs with normal speed (×1) to the future direction.

In the present invention, if the current viewing point and current broadcasting point of broadcast programs intersect, it is possible to perform at least one of continuously playing the past or future broadcasting zone of the broadcast program with the current viewing mode, automatically changing the viewing mode of the current broadcasting program to the normal speed viewing mode, or displaying guide information or additional contents after stopping or in the middle of playing the broadcast program.

Wherein, the intersection between viewing point and broadcasting point includes the cases that the current viewing point is located at the same position with the current broadcasting point and then becomes to be located in the future or past time zone of the current broadcasting point through time-shift or trick-play; or the current viewing point is located in the future or past time zone of the current broadcasting point and then becomes to be located at the same position as the current broadcasting point through time-shift or trick-play; or the current viewing point is located in the past time zone of the current broadcasting point and then moves at once to the future time zone or the current viewing point is located in the future time zone of the current broadcasting point and then moves at once to the past time zone.

Figure 1:
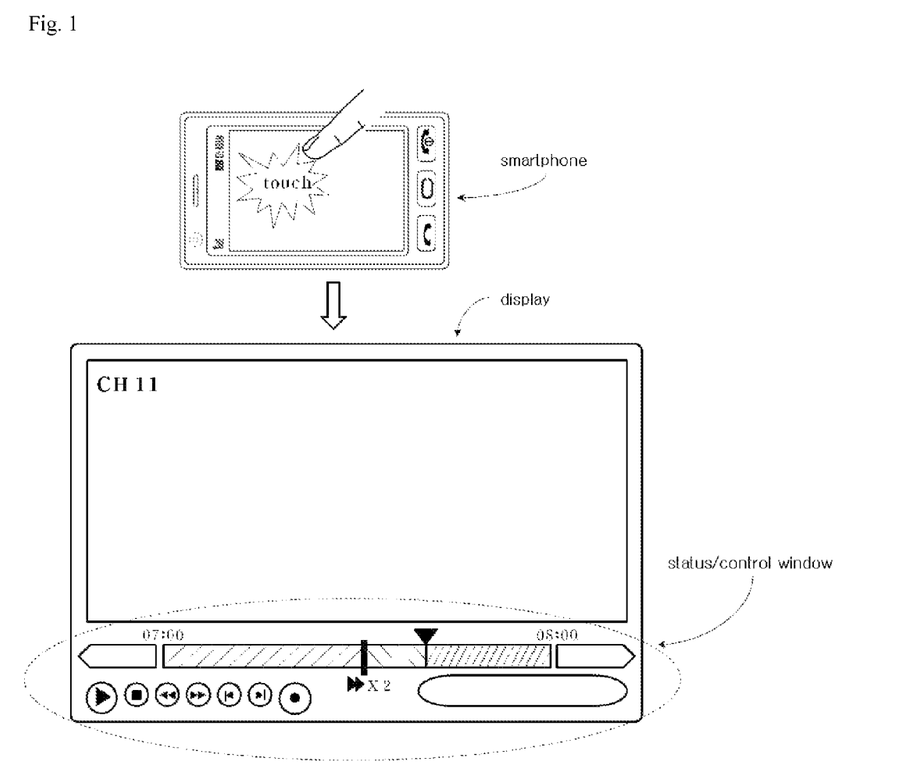
FIG. 1 shows an exemplary user interface screen for playing broadcast programs in accordance with an embodiment of the present invention.

FIG. 1 shows an exemplary user interface screen for playing broadcast programs in accordance with an embodiment of the present invention, where it is assumed that broadcast programs are viewed by running a television application on a portable terminal (i.e., smartphone). At this time, if a user touches the screen of the portable terminal, the television application (or app) displays a status/control window including status information and control buttons related to playing the broadcast programs.

Said status/control window can be displayed in different ways according to the types of televisions. For example, in the case of using a traditional television (TV), which is due to be controlled with a remote controller, only status window is displayed without the control window. And in the case of using the computer-assisted television, the status/control window can be displayed by using the input devices such as a mouse or a keyboard. Wherein, the status/control window is shown for the exemplary explanations, and not for restricting its design or screen configuration.

Figure 2:
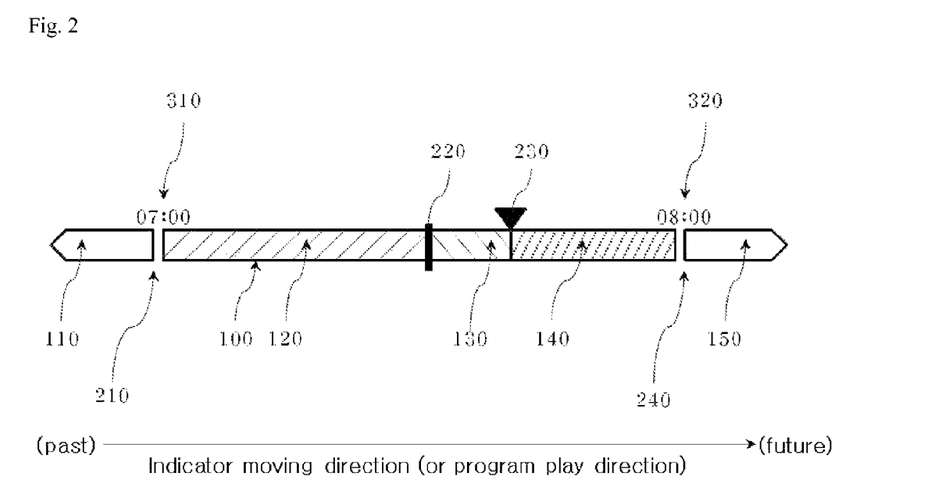
FIG. 2 shows an exemplary status window separately displayed on the screen of the user interface shown in FIG. 1 in accordance with an embodiment of the present invention.

FIG. 2 shows an exemplary a status window separately displayed on the screen of the user interface in FIG. 1, as shown in the FIG. 2, the status window comprises at least more than one of a status bar (100), a status indicator (210~240) and time information(310, 320).

Said status bar (100) can be divided into a plurality of regions (zones) (110~150) with the status indicator (210~240) as boundary, in which the information (i.e., total play time, the play completed time, the remaining play time, etc.) related to playing the broadcast program is displayed on each region.

The first region (110) of said status bar (100) is the region representing the past broadcast program broadcasted earlier in time than the currently being broadcasted program. And the second region (120) and the third region (130) represent the past time regions of the current broadcast program which is currently being broadcasted. The second region (120) is the past time region of the current viewing point and the third region (130) is the region representing the time zone between the current viewing point and the current broadcasting point. The fourth region (140) is the future time region of the current broadcast program, and the fifth region (150) is the region representing a new broadcast program to be broadcasted in the future after finishing the broadcast program which is currently being broadcasted.

At this time, each region (110~150) of the status bar can be displayed by using different colors, thereby a user can easily be able to distinguish the regions. Of course, said region can also surely be separated by a variety of ways (2D, 3D, separator, a slash, and different gray scales, etc.), in addition to using different colors to distinguish the regions, thus the separation methods of the regions are not limited by the above mentioned ways. In addition, the width of said each region (110~150) may be varied according to the movements for the locations of the status indicators (210~240).

The locations for all or some of the status indicators (210~240) can be moved by enabling a user directly to move (i.e., time-shift) the status indicator to the desired location, or the locations for the corresponding status indicator can be automatically moved with the play speed (i.e., trick-play) associated with the receiving status of the broadcast program. At this time, as said status indicator is moved, the display information associated with the status indicator is also changed.

The first status indicator (210) is for distinguishing the current broadcasting program from the previously broadcasted other broadcast program, and the space between each status bar indicating each broadcast program (ex: the current broadcast program and the previously broadcasted program) can be separately expressed by a constant interval as shown in the FIG. 2.

The second status indicator (220) indicates the point that is currently being played (the current playing point) in the current broadcast program, and it is also the indicator showing the point (current viewing point) where a user is currently viewing the broadcast program.

Moreover, said the second status indicator (220) is moved with reference speed (e.g., ×1, a normal speed) on the state of playing the broadcast program, or it can also be more quickly moved with user selected speed (e.g., ×2, ×4, etc.), or it can be moved with the control that a user selects the second status indicator and drags to the desired position (or point), in which the broadcast program is immediately played from the very moved position. That is, said moved point (position) becomes to be the current viewing point (position).

At this time, a user can select said second status indicator (220), and move to the future time zone of the current broadcasting point. That is, the user can select said second status indicator and move it to more advanced point (the future time zone of broadcast program) than the third status indicator (230). In other words, it is possible to move said the second status indicator (220) to the future time zone which is not yet broadcasted, and the detailed operation method is described with reference to the accompanying other drawings.

The third status indicator (230) indicates the broadcasting point (i.e., current broadcasting point) in which the broadcast program is currently being broadcasted in real-time, and the moving speed of the third status indicator can be faster or slower according to the receiving speed (or the download speed of broadcast program) of broadcast program (i.e., broadcast program including image or audio).

The fourth status indicator (240) is for distinguishing the current broadcast program from the new future broadcast program, and the space between each status bar indicating each broadcast program can be separately expressed by a constant interval as shown in FIG. 2.

And the time information (310, 320) indicates the start time and the finish time of the current broadcast program, and it can be displayed on the positions corresponding to the first status indicator (210) and the fourth status indicator (240), and the start time and the finish time can be detected from EPG (Electronic Program Guide).

The start time and finish time of the current broadcast program shown in an embodiment of the present invention are respectively described as 07:00 and 08:00, but the start time and the finish time can be changed according to the broadcasting time of the broadcast program. Moreover, each said time can also be described with relative time interval.

Figure 3:
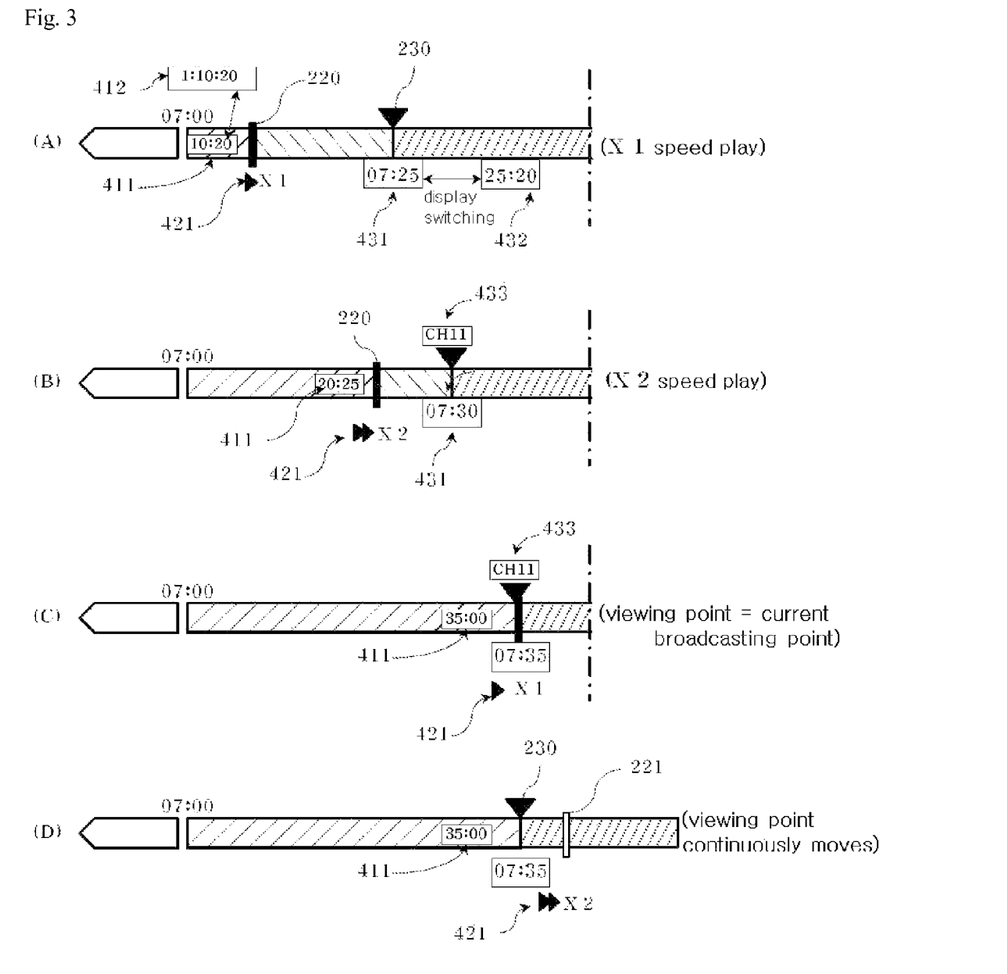
FIG. 3 shows an exemplary drawing for explaining the method of rendering a user interface according to an embodiment of the present invention, in case that while a user views the past time zone of the broadcast program, the play speed overtakes the speed of broadcasting speed and then the play speed continuously moves to the future broadcasting time zone.

FIG. 3 shows an exemplary drawing for explaining the method for rendering a user interface according to an embodiment of the present invention, in the case that a user starts to view the broadcast program in the past time zone and the play speed overtakes the broadcasting speed and then the viewing point continuously moves to the future broadcasting time zone.

As shown in FIG. 3 (a), it can be seen that the current broadcast program starts at 07:00 and the current viewing point is in the past time zone of the current broadcast program shown by the second status indicator (220) and the time interval between the current viewing point and the current broadcasting point can be calculated as shown by the second status indicator (220) and the third status indicator (230), and the future time zone (the remaining part of the current broadcast program) of the current broadcast program is indicated from the third status indicator (230).

At this time, for the purpose of making more precisely sense the amount of the time having been played, the play time information (411) corresponding to the position of the second status indicator can be additionally indicated, and it can be seen that the broadcast program has been played for the amount of 10 minutes and 20 seconds by referring to said play time information (411). Said play time information (411) is indicated with minute and second units, but the play time information including all of hour, minute, second unit can be surely displayed if the amount of the broadcast program to be played exceeds 1 hour.

In addition, for the purpose of making more accurately sense the current broadcasting point, the current broadcasting time information (431) or the play time information of the current broadcast program can be additionally displayed on any corresponding position of the third status indicator (230). Said play time information (432) means the information (ex, 25 minutes 20 seconds) representing the amount of time until the current broadcasting point out of the whole play time (ex, 1 hour) of the current broadcast program. By referring to the current broadcasting time information (431) and the play time information (432) of the current broadcast program, it can be seen that the current broadcasting time is 7:25 and the play amount of the current broadcasting program is 25 minutes and 20 seconds. It is possible to switch and selectively display said the current broadcasting time information (431) and the play time information (432) of the current broadcast program.

Moreover, it is possible to additionally display the viewing mode information on any corresponding position of the second status indicator (220), and said viewing mode information indicates the viewing speed (or broadcast program play speed) and the playing direction (forward/reverse), and said viewing mode information (421) indicates that the broadcast program is being currently played with the reference speed (normal speed or ×1 speed). At this time, said viewing speed (or broadcast program play speed) can be faster (ex: ×2, ×4, etc.) or slower (ex: ×0.5) according to the selection of the user, and the viewing speed can be selected by trick-play button (not shown) which is equipped with a hardware of television or displayed by a software.

By referring to the viewing mode information (421), as shown in FIG. 3 (b), it is possible to be seen that the broadcast program is played at ×2 (double speed). And the play time information (432) of the current broadcast program is the play time with referencing to the current broadcasting point, and the play time information (411) is the play time with referencing to the current viewing point. Note that the channel information of the current broadcast program can be additionally displayed on the corresponding position of the third status indicator (433). Said channel information (433) is effective to show a user the channel information of the broadcast program currently being viewed when the user views more than two channels at the same time. Meanwhile, if a user plays the broadcast program faster than the normal speed, there occurs a moment when the viewing point is matched with the broadcasting point.

When the viewing point and the current broadcasting point become to be matched as shown in FIG. 3 (c), one of those operations which continuously and seamlessly view (play) the past or future broadcasting region of the current broadcast program with the current viewing mode, or automatically switch the viewing mode of the current broadcast program to normal speed viewing mode, or display the guide information or additional contents after stopping or in the middle of playing the broadcast program, can be performed.

After the viewing point and the current broadcasting point become to be matched as shown in FIG. 3 (d), the viewing point can be moved forward (i.e., to the future time zone) to pass the intersecting point with the current broadcasting point, without adjusting the play speed of said viewing point (ex: keeping ×2 speed). At this time, a user can perceive the intersecting moment by displaying the second status indicator (221) of which the color is changed from the second status indicator (220) at the moment when said viewing point is intersected with the current broadcasting point, i.e., the moment when the viewing point is advanced to enter the future time zone.

Meanwhile, at the moment when the current broadcasting point and the viewing point are intersected as above, it is possible to convert the viewing mode according to whether the future broadcast program is continuously viewable, or to continuously view the future broadcast program in keeping the previous viewing mode. If there is also no future broadcast program, guide information (guide message) or alternative information (additional contents) after stopping playing the broadcast program or in the middle of playing the broadcast program can be displayed. Said guide information (guide message) comprises at least one of the information for the current broadcast program being currently played, the information for the current viewing mode, the information for the possibility of time-shift or trick-play to the future time zone after said the current broadcasting point, the information for the next broadcast program or the combinations thereof.

Whether performing time-shift or trick-play to the future time zone is possible can be indicated by activating or inactivating the corresponding region or trick-play button. And said additional contents includes at least one of music, advertisement, the guide information for the next broadcast program of the current broadcast program, guide image for the next broadcast program, preview image, game, EPG or the combinations thereof.

Figure 4:
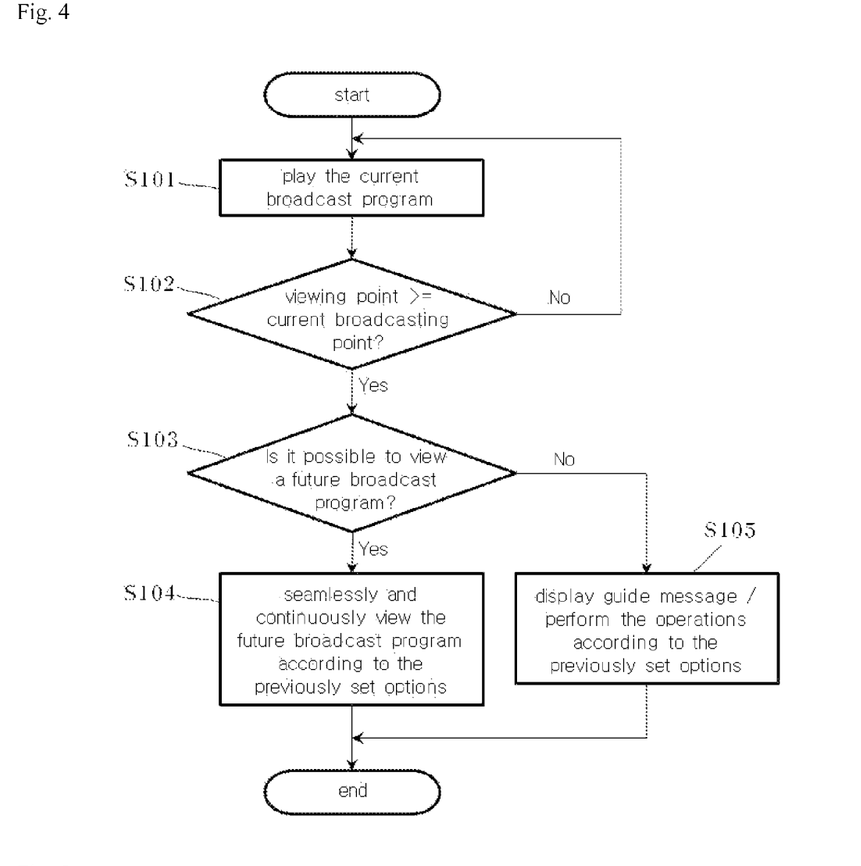
FIG. 4 shows an exemplary flowchart for explaining the operations, according to an embodiment of the present invention, in case that while the current broadcast program is being played, the play speed overtakes the speed of broadcasting speed and then the play speed continuously moves to the future broadcasting time.

FIG. 4 shows an exemplary flowchart for explaining the operations according to an embodiment of the present invention, in the case that the current broadcast program is being played and the play speed overtakes the speed of broadcasting speed.

As shown in the FIG. 4, while the current broadcast program is being played (S101) and in the cases that the viewing point overtakes the current broadcasting point (for example S102) and there exists a future broadcast program being able to be viewed (S103), the future broadcast program can be continuously and seamlessly viewed according to the previously set options. And if there is no future broadcast program being able to be viewed (S103), guide message is displayed or the operations according to the previously set options are executed (S105).

Said guide message might include the guiding message indicating that the viewing point intersects the current broadcasting point or the information asking a user to select the previously set options or new options. Moreover, said guide message information comprises at least one of the information for the broadcast program which is currently being played; the information for the current viewing mode; the information for whether time-shift or trick-play to the future time zone is possible or not after said current broadcasting point; the information for the next broadcast program (i.e., future broadcast program); or the combinations thereof. In addition, if necessary, a user can execute the operations related to the previously set options according to the previously set options (S104), and also change the viewing mode of the future broadcast program according to the previously set options.

For example, a user interface rendering device, according to the operations related to the previously set options, 1) automatically can convert the play speed to the same speed (×1, normal speed) as the receiving speed for the current broadcast program; 2) can display alternative information on the screen. For example, the alternative information means the contents comprising at least one of music, advertisement, the guide image for next time broadcast program of the current broadcast program, the guide image or preview image for the next broadcast program, game, EPG or the combinations thereof.

The contents comprising at least one of music, advertisement, the guide image for next time broadcast program of the current broadcast program, the guide image or preview image for the next broadcast program, game, EPG or the combinations thereof can be called as additional contents, and the contents are not necessarily limited to the contents listed above.

Figure 5A:
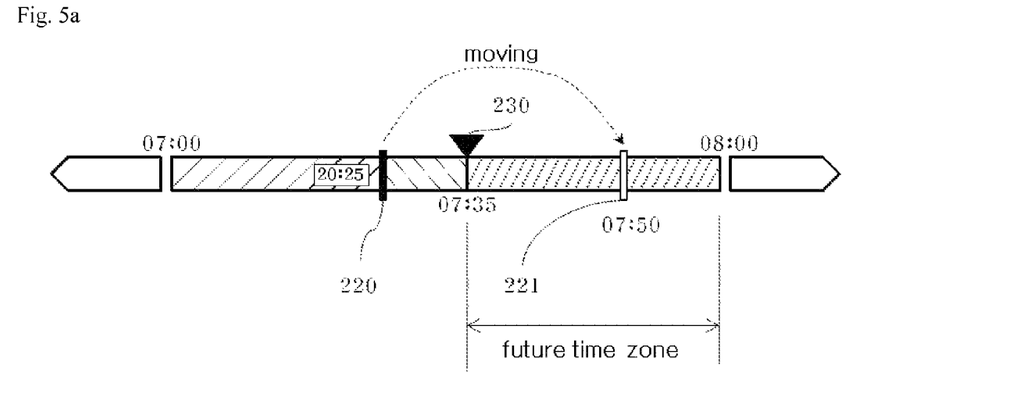
Figure 5B:
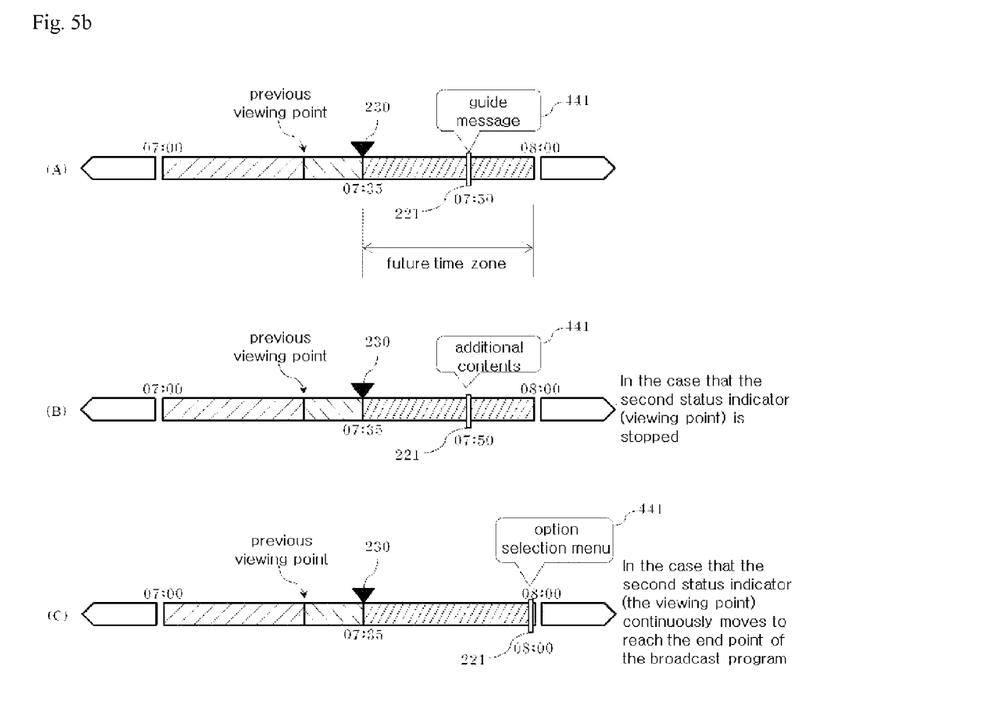
Figure 5C:
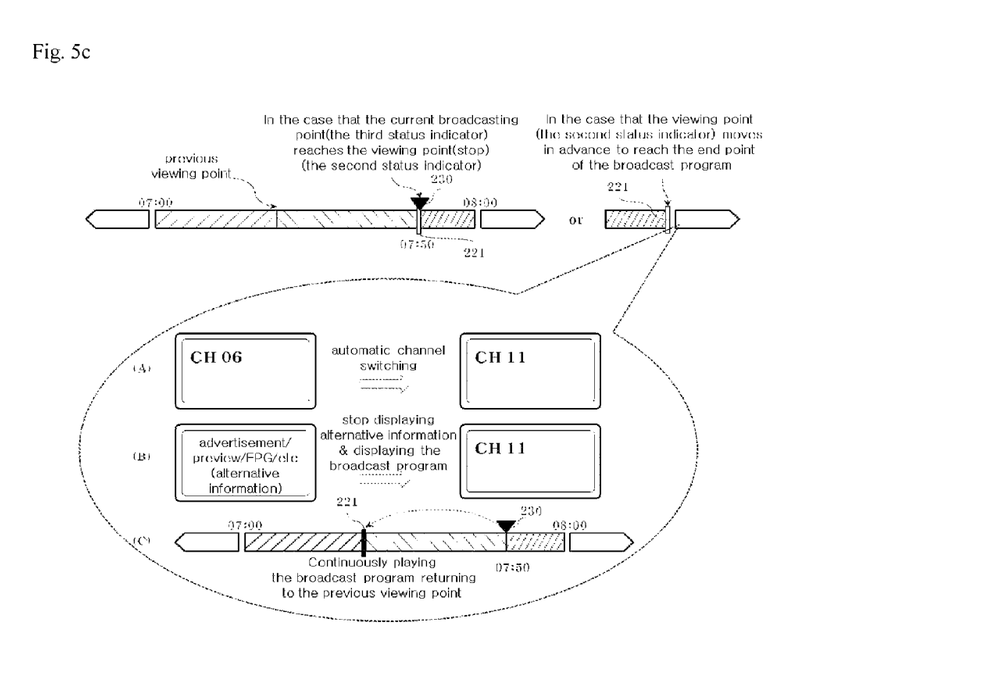

FIG. 5A to 5C show exemplary drawings for explaining the method for rendering a user interface according to an embodiment of the present invention in case that the viewing point is in the future time zone.

As shown in FIG. 5A, a user can select the second status indicator (220) and move to any required point on the status bar. At this time, if said moved point is a future broadcasting point (or a certain point in the future time zone), the color of the second status indicator (221) can be changed for being able to be perceived by a user. As described in the problems of the prior arts, the future time zone could not be selected as the viewing point in the prior arts. However, it is possible in the present invention to enable a user to continuously view the future broadcast program by continuously moving the second status indicator (221) to the future broadcasting point (or a certain point in the future time zone) regardless of whether there exists a received broadcast program or not. That is, it is possible to provide a time-free play or time-free view which enables a user to view (or play) the broadcast program at a certain required point in the future time zone as well as past time zone of the current broadcast program.

Moreover, said the second status indicator (221) can be adjusted not to be continuously moved forward (i.e., to the future direction), and in this case said second status indicator (221) becomes to be stopped at a certain required point without changing states. As described above, the moment that the third status indicator (230) is intersected while the second status indicator (221) is stopped (i.e., during the state in which viewing is stopped in the future time zone), that is, at the moment that the current broadcasting point is intersected with the current viewing point, the current broadcast program can be started to be played. In addition, the second status indicator (221) which indicates said viewing point, regardless of the movement of the third status indicator which indicates the current broadcast point, can continuously move forward (i.e., to the future direction) according to the previously set options and move until the point that the broadcast program ends.

As shown in FIG. 5B (A), if a user moves the second status indicator (221) to the future time zone of the current broadcast program, basically the future broadcast program can be continuously and seamlessly viewed. However, if the is no corresponding future broadcast program, the user interface rendering apparatus can display the guide message shaped as a balloon help message. And the corresponding operations according to the previously set options are executed, or additional contents (441) can be displayed as shown in FIG. 5B (B). For example, said additional contents can be displayed on a window which is newly generated or on an additional small window which is generated by the method of a PIP (Picture in Picture).

As shown in FIG. 5B (C), option selection menu (441) can be displayed in order to be able to change the previously set options selection items or select new options.

For example, said guide message can be the message to guide that there is no broadcast program to be played when the future time zone of the current broadcast program is selected as the viewing point, and said option selection menu (441) can be the menu to be able to select the operations to be performed before the moment when the third status indicator (230) moves to match with the second status indicator (221) and at the moment when said the third status indicator (230) moves to match with the second status indicator (221), or as shown in FIG. 5B, the menu which is selectable for the operations to be automatically performed when the second status indicator (221) representing the viewing point continuously moves forward with the previously set play speed (ex: ×2) and reaches the end point of the broadcast program within the future time zone of the current broadcast program which is selected at the first time.

At this point, said option selection menu can make the option selection items regardless of the operations required by a user inactivated (ex: X), and only the option selection items associated with said operations activated (ex: O). Thus, a user can select and store the required options from activated option selection items Meanwhile, the reasons, as described above, why a user moves the viewing point to the future time zone of the current broadcast program or the next broadcast program, might be 1) the case that the broadcast program that a user does not want to see is expected to be broadcast for a certain amount of time, 2) the case that the current broadcast program is the rebroadcast program and some parts of the program have already been viewed in the broadcasting time, or 3) the case that it is necessary to perform some other works (ex: viewing other broadcast program, telephone calls, text chatting, etc.) for a certain amount of time when the broadcast program is being viewed.

Therefore, according to the reasons why a user selects the viewing point in the future time zone of said the current broadcast program or the next broadcast program, the user becomes to select the operations to be performed at the moment that said third status indicator (230) is moved to match with the second status indicator (221) which has remained in stop state, or to select the operations to be performed at the moment that said the second status indicator (221) is continuously moved to arrive at the end point of the broadcast program.

As shown in FIG. 5C, in the cases that the third status indicator (230) representing the current broadcasting point is continuously moved forward and arrives at the second status indicator (221) which has remained in stop state in the future time zone of the first selected current broadcast program or the next broadcast program, or the second status indicator (221) representing the viewing point is continuously moved forward within the future broadcast time zone and arrives at the end point of the broadcast program, a user can perform at least one of the operations, according to the previously set options, which continuously play the broadcast program with the viewing mode of the current broadcast program, automatically convert the viewing mode of the current broadcast program to the normal speed viewing mode, display guide information after stopping playing or in the middle of playing the broadcast program, or display additional contents.

As shown in FIG. 5C (A) for example, if the broadcast program which prefers to view is being broadcasted in another channel (CH06) in the same time zone, a user can view another channel (CH06) for a certain amount of time, and then at the moment when the current broadcasting point (the third status indicator) reaches the second status indicator (221) which has remained in stop state within the future time zone, or the second status indicator (221) representing viewing point is continuously moved forward and arrives at the end point of the current broadcast program, it will be automatically switched to the previous channel(ex: CH11).

In addition, as shown in FIG. 5C (B), if a user expects a program contents that a user do not want to view (or a program contents that a user already has viewed) to be broadcasted for a certain amount of time, a user can view alternative information (or additional contents) (ex: at least more than one of music, advertisement, a guide image for the next time program of the current broadcast program, a guide image or preview image for the next broadcast program, game, EPG or the combinations thereof) for a certain amount of time, and then at the moment when the current broadcasting point (the third status indicator) reaches the second status indicator (221) which has remained in stop state within the future time zone, or the second status indicator (221) representing the viewing point is continuously moved forward and arrives at the end point of the current broadcast program, it will be automatically switched to the previous channel(ex: CH11).

In addition, as shown in FIG. 5C (C), if it is necessary to perform some other works for a certain amount of time, at the moment when the current broadcasting point (the third status indicator) reaches the second status indicator (221) which has remained in stop state within the future time zone, or the second status indicator (221) representing the viewing point is continuously moved forward and arrives at the end point of broadcast program, it will be automatically returned to the point (i.e., with time-shift) where/when the play was suspended (i.e., the previous viewing point where/when the play was suspended, when moving the second status indicator to the future time zone), and continuously played from the point where/when the play was suspended (i.e., the previous viewing point).

Meanwhile, at the moment when the current viewing point (the point where the second status indicator is located) is moved according to the playing speed of the broadcast program and then arrives at the end point of the current broadcast program in the future time zone, it is possible to perform at least more than one of the those continuously playing the next broadcast program (i.e., the future broadcast program) with the current viewing mode, or playing the next broadcast program with normal speed viewing mode, moving the current broadcast program to the current broadcasting point (the point where/when the third status indicator is located) and playing with normal speed viewing mode, displaying said guide information after stopping playing or in the middle of playing the broadcast program, or displaying additional contents.

In addition, through the time-shift and trick play, if said the current viewing point (the point where/when the second status indicator is located) and said the current broadcasting point (the point where/when the third status indicator is located) are intersected in the middle of being moved to the past or future time zones, it is possible to perform at least more than one of those continuously playing the broadcast program in the past time zone or future time zone of the current broadcast program with the current viewing mode, automatically converting the viewing mode of the current broadcast program to the normal speed viewing mode, displaying said guide information after stopping playing or in the middle of playing the broadcast program, or displaying additional contents.

Figure 6:
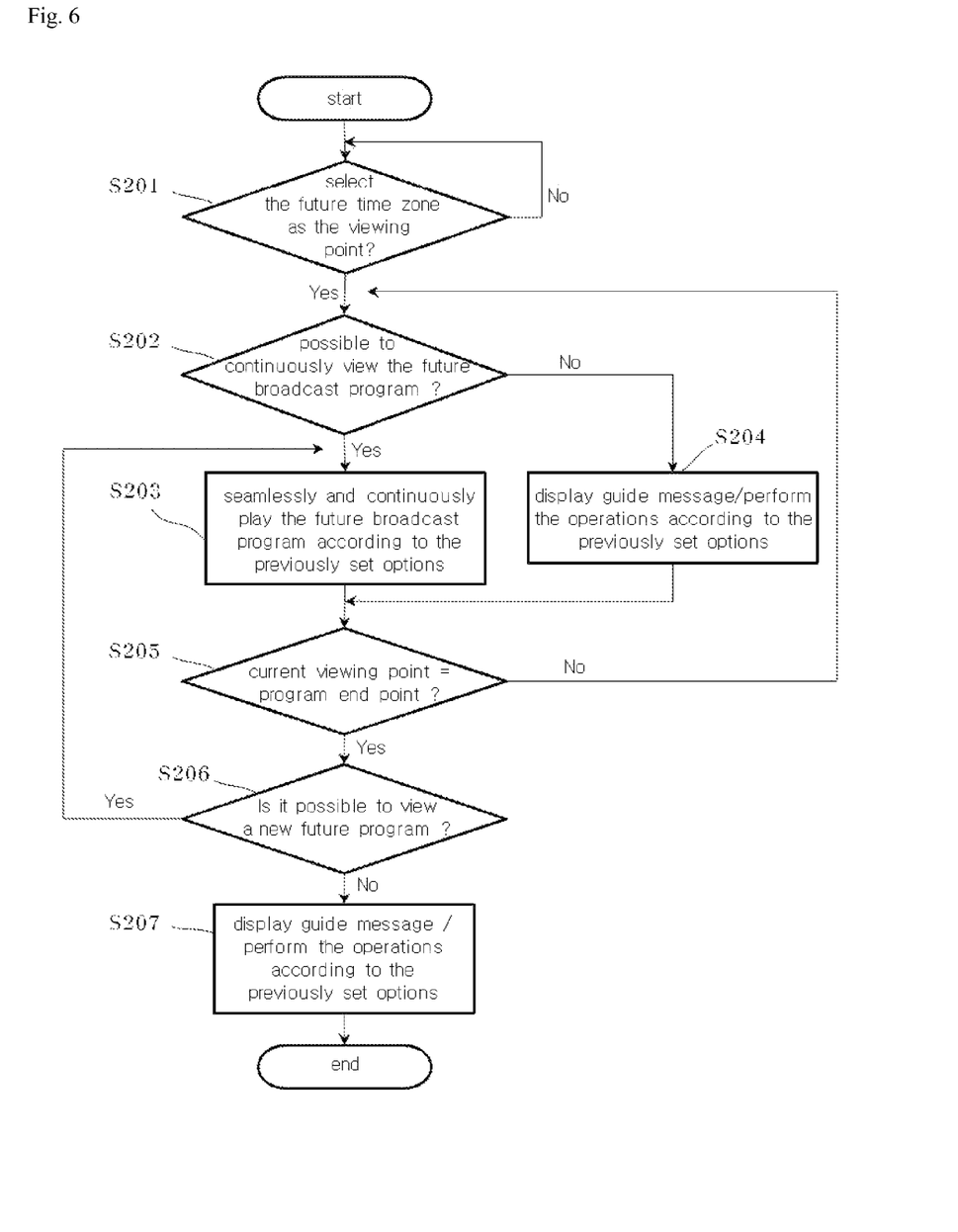
FIG. 6 shows an exemplary flowchart for explaining the operations in accordance with the present invention, in case that a user sets the viewing point to the future time zone.

FIG. 6 shows an exemplary flowchart for explaining the operations in accordance with the present invention in the case that a user sets the viewing point to the future time zone.

As shown in FIG. 6, if a user moves and selects the viewing point to the future time zone (ex: S201) while the current broadcast program is being played, for example if a user moves the second status indicator (220) to the future time zone within the status bar, a specific point within the future time zone becomes to be selected as a viewing point, and then if there exists a future broadcast program to be viewed (S202), a user seamlessly and continuously views the future broadcast program according to the previously set options (S203), and if there is no future broadcast program to be viewed, guide message is displayed or the operations according to the previously set options are performed (S204).

In addition, when the current viewing point reaches the end point of the broadcast program (S205) while the future broadcast program is being played or the operations according to the previously set options is being performed, if there exists a new future broadcast program to be viewable (S206), a user seamlessly and continuously views the new future broadcast program according to the previously set options (S203), and if there is no new future broadcast program to be viewable (S206), guide message is displayed or the operations according to the previously set options are performed (S207).

At this time, said operations according to the previously set options are those to be performed in the time period before reaching the future broadcasting point selected as a viewing point by a user, and to be performed at the moment when a viewing point is continuously moved forward and reaches the end point of the broadcast program.

For example, said operations according to the previously set options comprise producing at least more than one of music which is additional contents, advertisement, the guide image for the next time broadcast program of the current broadcast program, the guide image or the preview image for the next broadcast program, game, EPG or the combinations thereof.

On the other hands, if there is no new future broadcast program to be viewable in the case that said viewing point reaches the end point of the program (ex: S205), previously set guide messages are displayed or the operations according to the previously set options are performed (S207). For example, the operations according to the previously set options comprise producing at least more than one of music which is additional contents, advertisement, the guide image for the next time broadcast program of the current broadcast program, the guide image or the preview image for the next broadcast program, game, EPG or the combinations thereof.

Meanwhile, a user can select one of continuously viewing television or stopping (power off) television when the current broadcasting point and viewing point reach the end point of the program together. A user can select one of viewing real-time broadcast program or viewing the broadcast program of the past time zone, in the case of selecting continuously viewing television as described above.

The broadcast program in the past time zone can be continuously viewed by automatically moving (i.e., by time-shifting) the viewing point to the previous viewing point, at the same time that the program reaches the end point of the broadcast program, in the case of selecting that of viewing broadcast program of the past time zone as described above.

On the other hands, the present invention, at the moment when the current viewing point is located in the future time zone of the current broadcasting point, and then reaches the end point of the current broadcast program through trick-play or time-shift, comprises performing at least more than one method of playing the next broadcast program (i.e., the future broadcast program) with normal speed viewing mode, moving to the current broadcasting point and viewing the current broadcast program with normal speed viewing mode, or displaying said guide information or said additional contents after stopping or in the middle of playing the broadcast program.

While the invention has been disclosed with respect to a limited number of embodiments and explained by referring to embodiments illustrated in accompanying drawings, a person skilled in the art, having the benefit of this disclosure, will comprehend numerous and equivalent modifications and variations therefrom. It is intended that the appended claims cover all such modifications and variations as fall within the true spirit and scope of the present invention.

What is claimed is:

1. A method of rendering a user interface for playing a broadcast program, the method comprising:
   displaying a current viewing point indicator on a status bar which visually separates an already-viewed zone from a to-be-viewed zone of the broadcast program,
   wherein the current viewing point indicator is a current point of playback in the broadcast program being displayed to a user, and wherein the current viewing point can be controlled by the user;

displaying a current broadcasting point indicator on the status bar which visually separates an already-broadcasted zone from a to-be-broadcasted zone,
wherein the current broadcasting point indicator is a current point of broadcast of the broadcast program by a television station;

wherein the user can advance the current viewing point indicator past the current broadcasting point indicator to the to-be-broadcasted zone regardless of whether there exists a received broadcast program or not.

2. The method of claim 1, wherein, when the current viewing point indicator intersects the current broadcasting point indicator, guide information is displayed to the user, wherein the guide information comprises:

broadcast information for the broadcast program which is currently being broadcasted;

viewing information for a current viewing mode; and availability information indicating whether time-shift or trick-play is available to allow the user to move the current viewing point indicator to the to-be broadcasted zone.

3. The method of claim 1, wherein, if the current viewing point reaches an end of the to-be-broadcasted zone, a guide image or a preview image for a next broadcast program after the current broadcast program is displayed to the user.

4. The method of claim 1, further comprising, when the current viewing point indicator is located in a future time zone ahead of the current broadcasting point indicator and then reaches an end point of to-be-broadcasted zone, playing of a next broadcast program with an 1× speed viewing mode.

5. The method of claim 1, wherein the current viewing point indicator is displayed in a first mode if the current viewing point indicator is located in the already-broadcasted zone and is displayed in a second mode different than the first mode if the current viewing point indicator is located in the to-be-broadcasted zone.

6. An apparatus for rendering user interface for playing broadcast program, which causes a controller to:

display a current viewing point indicator on a status bar which visually separates an already-viewed zone from a to be viewed zone of the broadcast program,
wherein the current viewing point indicator is a current point of playback in the broadcast program being displayed to a user, and
wherein the current viewing point can be controlled by the user;

display a current broadcasting point indicator on the status bar which visually separates an already-broadcasted zone from a to-be-broadcasted zone,
wherein the current broadcasting point indicator is a current point of broadcast of the broadcast program by a television station;

wherein the user can advance the current viewing point indicator past the current broadcasting point indicator to the to-be-broadcasted zone regardless of whether there exists a received broadcast program or not.

7. The apparatus of claim 6, wherein, when the current viewing point indicator intersects the current broadcasting point indicator, guide information is displayed to the user, wherein the guide information comprises:

broadcast information for the broadcast program which is currently being broadcasted:

viewing information for a current viewing mode; and availability information indicating whether time-shift or trick-play is available to allow the user to move the current viewing point indicator to the to-be-broadcasted zone.

8. The apparatus of claim 6, wherein, if the current viewing point reaches an end of the to-be-broadcasted zone, a guide image or a preview image for a next broadcast program after the current broadcast program is displayed to the user.

9. The apparatus of claim 6, further comprising, when the current viewing point indicator is located in a future time zone ahead of the current broadcasting point indicator and then reaches an end point of the to-be-broadcasted zone, playing of a next broadcast program with a normal speed viewing mode.

10. The apparatus of claim 6, wherein the current viewing point indicator is displayed in a first mode if the current viewing point indicator is located in the already-broadcasted zone and is displayed in a second mode different than the first mode if the current viewing point indicator is located in the to-be-broadcasted zone.

11. A non-transitory computer-readable recording medium having recorded thereon a program code for executing the method of rendering user interface for playing said broadcast program of claim 1.

* * * * *